(12) United States Patent
Kojima et al.

(10) Patent No.: US 8,044,534 B2
(45) Date of Patent: Oct. 25, 2011

(54) METHOD OF CONTROLLING DC/DC CONVERTER, METHOD OF CONTROLLING DC/DC CONVERTER APPARATUS, AND METHOD OF CONTROLLING DRIVING OPERATION OF ELECTRIC VEHICLE

(75) Inventors: Yasushi Kojima, Utsunomiya (JP); Naoyuki Mimatsu, Utsunomiya (JP); Seigo Murashige, Utsunomiya (JP); Yutaka Asano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 12/392,946

(22) Filed: Feb. 25, 2009

(65) Prior Publication Data
US 2009/0212634 A1 Aug. 27, 2009

(30) Foreign Application Priority Data

Feb. 25, 2008 (JP) ................................. 2008-042944

(51) Int. Cl.
*H02J 7/34* (2006.01)
(52) U.S. Cl. ................................ 307/52; 307/45; 307/46
(58) Field of Classification Search .................... 307/45, 307/46, 52
See application file for complete search history.

(56) References Cited

U.S. PATENT DOCUMENTS
7,715,217 B2 * 5/2010 Manabe et al. ................ 363/95

FOREIGN PATENT DOCUMENTS
| JP | 2002-112534 | 4/2002 |
| JP | 2005-218260 | 8/2005 |
| JP | 2007-159315 | 6/2007 |

OTHER PUBLICATIONS
Japanese Office Action for Application No. 2008-042944, dated Jan. 12, 2010.

* cited by examiner

*Primary Examiner* — Rexford Barnie
*Assistant Examiner* — Hal Kaplan
(74) *Attorney, Agent, or Firm* — Nelson Mullins Riley & Scarborough LLP; Anthony A. Laurentano (57) ABSTRACT

When a DC/DC converter switches between a primary voltage control mode, a secondary voltage control mode, and a current limiting mode as operation modes, an I-term resetting processor outputs an I term depending on the duty ratio in the operation mode before being switched to a PID processor. The PID processor performs a PID control process based on the input I term. A drive duty ratio setter outputs a drive duty ratio immediately after the control mode switching, which is substantially equal to the duty ratio in the operation mode before being switched. As a result, the duty ratios in the operation mode before being switched and the operation mode after being switched are made continuous with respect to each other.

8 Claims, 9 Drawing Sheets

METHOD OF CONTROLLING DC/DC CONVERTER, METHOD OF CONTROLLING DC/DC CONVERTER APPARATUS, AND METHOD OF CONTROLLING DRIVING OPERATION OF ELECTRIC VEHICLE

BACKGROUND OF THE INVENTION

1. Field of the Invention

The present invention relates to a method of controlling a DC/DC converter disposed between a first power device and a second power device for energizing switching devices with given duty ratios, a method of controlling a DC/DC converter apparatus incorporating such a DC/DC converter, and a method of controlling driving operation of an electric vehicle incorporating such a DC/DC converter apparatus.

2. Description of the Related Art

Heretofore, there has been proposed an electric vehicle wherein a travel electric motor is energized by a battery and a fuel cell, the fuel cell being connected to the travel electric motor through an inverter and the battery being connected to the fuel cell through a DC/DC converter which functions as a bidirectional voltage converter (see, Japanese Laid-Open Patent Publication No. 2007-159315).

A DC/DC converter apparatus which incorporates the DC/DC converter controls the voltage across the secondary side of the DC/DC converter (hereinafter referred to as "secondary voltage"), i.e., the voltage (inter-terminal voltage) of the fuel cell, and also controls electric currents flowing through the respective phases of the DC/DC converter so that the electric currents will be lower than an allowable current level depending on the temperature of each of the switching devices of the phases of the DC/DC converter.

Providing an accessory is connected to the battery, if the power cable interconnecting the battery and the DC/DC converter is disconnected, it is desirable to interrupt an ordinary process of controlling the secondary voltage (hereinafter referred to as "secondary voltage control mode") and to control the voltage across the primary side of the DC/DC converter (hereinafter referred to as "primary voltage"), i.e., to control the voltage across the battery for protecting the accessory for normal operation (hereinafter referred to as "primary voltage control mode") in order to keep the voltage applied to the accessory connected to the battery at an appropriate level.

In the electric vehicle, a fuse is connected to an output terminal of the battery. When an overcurrent flows from the battery, the fuse is immediately blown out to prevent the overcurrent from further flowing from the battery, thereby protecting the battery. If the fuse is blown out, then the battery is unable to supply electric power through the DC/DC converter and an inverter to the electric motor until the fuse is replaced with a new one. As a result, the electric vehicle cannot be driven in the meantime. Therefore, it is desirable to interrupt the secondary voltage control mode before the fuse is blown out, and to change to a control process for keeping the current flowing through the DC/DC converter below a given threshold level (hereinafter referred to as "current limiting mode").

The operation modes of the DC/DC converter, i.e., the primary voltage control mode, the secondary voltage control mode, and the current limiting mode, have different variables to be controlled. Consequently, simply switching from one of the operation modes to another tends to cause voltage and current fluctuations (disturbances) such as temporary overshoots of the primary voltage, the secondary voltage, and the current upon switching between the operation modes.

SUMMARY OF THE INVENTION

It is an object of the present invention to reduce voltage and current fluctuations upon switching between operation modes.

To achieve the above object, there is provided in accordance with an aspect of the present invention a method of controlling a DC/DC converter disposed between a first power device and a second power device for energizing at least one switching device with given duty ratios, comprising the steps of setting, as operation modes, at least two of a primary voltage control mode for controlling a primary voltage of the DC/DC converter which is associated with the first power device, a secondary voltage control mode for controlling a secondary voltage of the DC/DC converter which is associated with the second power device, and a current limiting mode for controlling the primary voltage or the secondary voltage in order to prevent a current which flows between the first power device and the second power device through the DC/DC converter from exceeding a threshold value, and when switching between the at least two operation modes, making a duty ratio in the operation mode before being switched and a duty ratio in the operation mode after being switched, continuous with respect to each other.

According to the present invention, when switching between the at least two operation modes, the duty ratio in the operation mode before being switched and the duty ratio in the operation mode after being switched are made continuous with respect to each other. Therefore, voltage and current fluctuations are reduced immediately after switching between the operation modes.

The present invention is applicable to a DC/DC converter apparatus which includes the DC/DC converter and a controller for energizing the at least one switching device. The controller sets the duty ratios in the respective operation modes according to a feedback control process including an integral process (a method of controlling a DC/DC converter apparatus).

The controller sets an integral term of the feedback control process in each of the operation modes. When switching between the operation modes, the controller sets the integral term in the operation mode after being switched in order to substantially equalize the duty ratio in the operation mode before being switched and the duty ratio in the operation mode after being switched to each other. The duty ratio is reliably prevented from abruptly changing when switching between the operation modes. As a result, voltage and current fluctuations are efficiently reduced immediately after switching between the operation modes.

The controller performs the feedback control process which includes a proportional process, the integral process, and a derivative process, in each of the operation modes. When switching between the operation modes, the controller sets the integral term in the operation mode after being switched, based on a difference obtained by subtracting proportional and derivative terms of the feedback control process in the operation mode after being switched, from the duty ratio in the operation mode before being switched. Thus, the present invention is applicable to a DC/DC converter apparatus for controlling the voltages and the current according to a PID (Proportional plus Integral plus Derivative) control process.

If the operation mode is the primary voltage control mode or the secondary voltage control mode, the controller performs a feed-forward control process for setting the primary voltage or the secondary voltage to a target voltage.

If the operation mode after being switched is the primary voltage control mode or the secondary voltage control mode, the controller sets the integral term in the operation mode after being switched, based on a difference obtained by subtracting the proportional and derivative terms in the operation mode after being switched and a feed-forward term of the feed-forward control process in the operation mode after being switched, from the duty ratio in the operation mode before being switched. Therefore, the present invention is applicable to a DC/DC converter apparatus for controlling the voltages and the current according to the PID control process and the feed-forward control process.

Preferably, the method further comprises the step of switching from the primary voltage control mode to the secondary voltage control mode based on whether the first power device suffers a possible disconnection or not, or switching from the secondary voltage control mode to the primary voltage control mode based on whether the first power device suffers a possible disconnection or not, or switching from the primary voltage control mode or the secondary voltage control mode to the current limiting mode based on whether the current is of a value exceeding the threshold value or not, and after the DC/DC converter has switched to the current limiting mode, monitoring the primary voltage or the secondary voltage, and returning from the current limiting mode to the primary voltage control mode or the secondary voltage control mode.

After the DC/DC converter has switched from the secondary voltage control mode to the primary voltage control mode, the DC/DC converter can quickly return to the secondary voltage control mode. Even after the DC/DC converter has switched from the primary voltage control mode or the secondary voltage control mode to the current limiting mode, the DC/DC converter can quickly return from the current limiting mode to the primary voltage control mode or the secondary voltage control mode.

The present invention is applicable to an electric vehicle which includes the DC/DC converter apparatus, the first power device, and the second power device (a method of controlling driving operation of an electric vehicle). The first power device comprises an electricity storage device for generating the primary voltage, the electricity storage device being connected to an accessory, and the second power device comprises an electric motor for rotating a wheel and an electric generating device for generating a voltage, the electric generating device being connected to an inverter for energizing the electric motor. The secondary voltage is the generated voltage or a regenerative voltage generated in the inverter when the electric motor operates as an electric generator.

Since voltage and current fluctuations upon operation mode switching are reliably reduced, the electricity storage device, the electric motor, and the electric generating device can be of a long service life.

If the electric generating device is a fuel cell, then the fuel cell can easily have a long service life because the stacked structure of the fuel cell which is susceptible to voltage and current fluctuations is reliably prevented from being deteriorated.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

An electric vehicle having a DC/DC converter apparatus which incorporates therein a DC/DC converter to which a method of controlling a DC/DC converter according to the present invention is applied will be described below with reference to the drawings.

Figure 1:
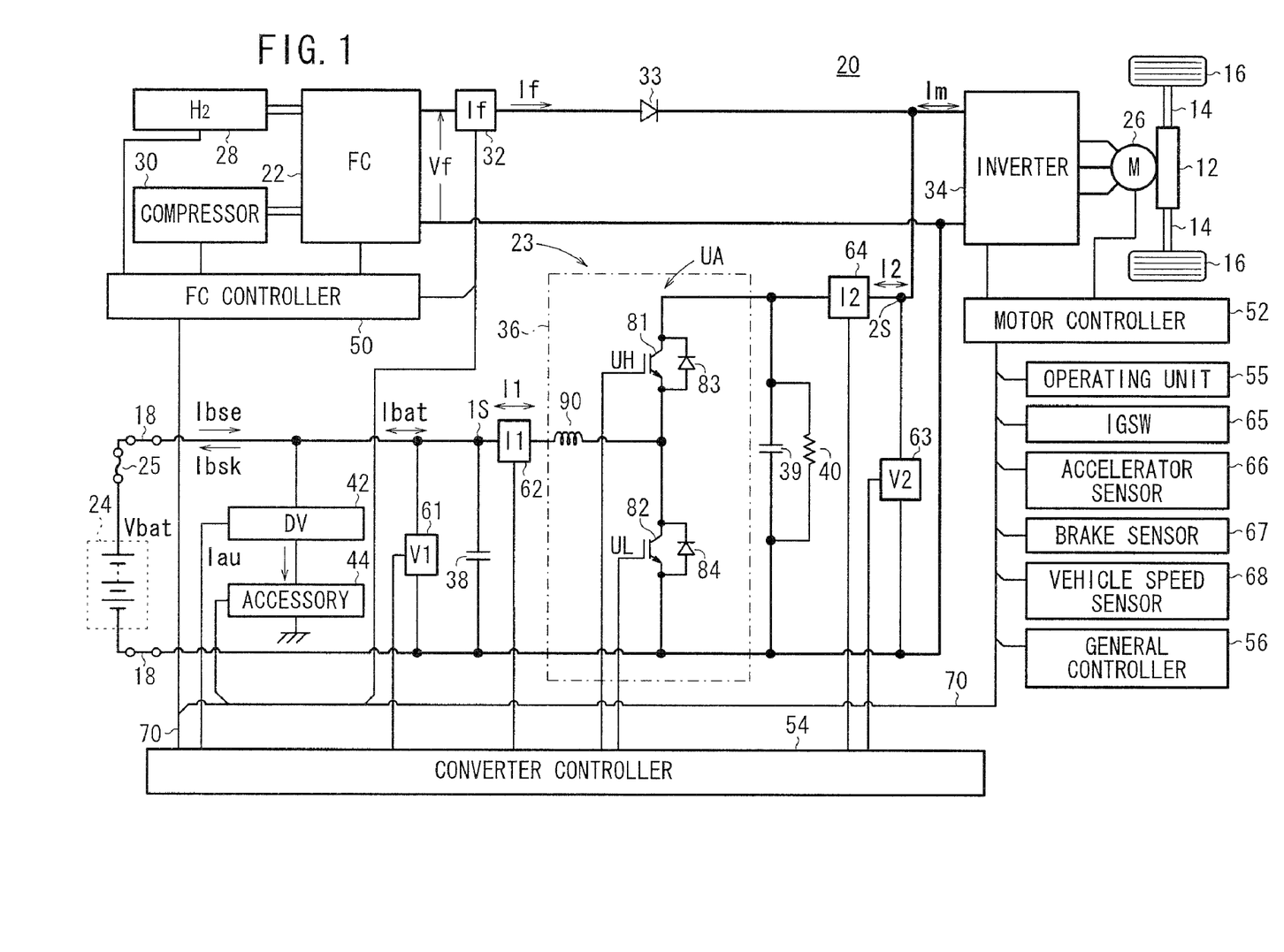
FIG. 1 is a circuit diagram, partly in block form, a fuel cell vehicle according to an embodiment of the present invention.

FIG. 1 is a circuit diagram, partly in block form, a fuel cell vehicle 20 as an electric vehicle according to an embodiment of the present invention.

As shown in FIG. 1, the fuel cell vehicle 20 basically comprises a hybrid power supply system including a fuel cell (FC) 22 as an electric generating device for generating a voltage Vf and an electricity storage device (referred to as "battery") 24 which is an energy storage for generating a battery voltage Vbat, a travel motor (electric motor) 26 as a load for being supplied with a current (electric power) from the hybrid power supply system through an inverter 34, and a DC/DC converter apparatus {also referred to as "VCU (Voltage Control Unit)"} 23 for converting voltages between a primary end 1S connected to the battery 24 and a secondary end 2S connected to the fuel cell 22 and the motor 26 (the inverter 34). Rotation of the motor 26 is transmitted through a speed reducer 12 and shafts 14 to wheels 16, rotating the wheels 16.

In the present embodiment, the battery 24 serves as a first power device, and the fuel cell 22 and the motor 26 which operates in a regenerative mode jointly serve as a second power device. The battery 24 is connected to the primary end 1S of the VCU 23 by power lines 18.

The VCU 23 comprises a DC/DC converter 36 and a converter controller 54 for energizing switching devices 81, 82 of the DC/DC converter 36.

The fuel cell 22 is of a stacked structure made up of cells each comprising an anode, a cathode, and a solid polymer electrolyte membrane sandwiched between the anode and cathode. The fuel cell 22 is connected to a hydrogen tank 28 and an air compressor 30 by pipes. The fuel cell 22 generates a current If due to an electrochemical reaction between a reaction gas (fuel gas) of hydrogen and air (oxygen-containing gas). The generated current If is supplied through a current sensor 32 and a diode (also referred to as "disconnecting diode") 33 to the inverter 34 and/or the DC/DC converter 36.

The inverter 34 converts the direct current If into an alternating motor current Im that is supplied to the motor 26 which is operating in a propulsive power mode. The inverter 34 also converts an alternating motor current Im that is generated by the motor 26 in a regenerative mode into a direct motor current Im, which is supplied from the secondary end 2S to the primary end 1S through the DC/DC converter 36.

A secondary voltage V2, which may be the regenerated voltage in the regenerative mode or the generated voltage Vf across the fuel cell 22, is converted into a low primary voltage V1 by the DC/DC converter 36. The low primary voltage V1 is further converted into a lower voltage by a downverter 42. The downverter 42 supplies, under the lower voltage, an accessory current Iau to accessories 44 such as lamps, power window motors, wiper motors, etc. and also supplies any excess current as a battery current Ibat (sink current Ibsk) to charge the battery 24.

The battery 24, which is connected to the primary end 1S, may comprise a lithium ion secondary battery, a nickel hydrogen secondary battery, or a capacitor. In the present embodiment, the battery 24 comprises a lithium ion secondary battery.

The battery 24 supplies the accessory current Iau to the accessories 44 through the downverter 42, and also supplies a battery current Ibat (source current Ibse) for supplying the motor current Im through the DC/DC converter 36 to the inverter 34. A fuse 25 for protecting the battery 24 against short-circuiting is connected in series to an output terminal of the battery 24.

The motor current Im supplied to the inverter 34 is the sum of a secondary current I2 which is converted from the battery current Ibat by the VCU 23 and the generated current If.

The downverter 42 has an insulated transformer connected to its output terminal. The accessories 44 have a positive terminal supplied with a rectified voltage from the secondary coil of the insulated transformer and a negative terminal grounded to the chassis of the fuel cell vehicle 20.

Smoothing capacitors 38, 39 are connected respectively across the primary and secondary ends 1S, 2S. A resistor 40 is connected across the smoothing capacitor 39, i.e., across the fuel cell 22.

The fuel cell 22, the hydrogen tank 28, and the air compressor 30 make up a system controlled by an FC controller 50. The inverter 34 and the motor 26 make up a system controlled by a motor controller 52 which includes an inverter driver. The DC/DC converter 36 makes up a system controlled by the converter controller 54 which includes a converter driver.

The FC controller 50, the motor controller 52, and the converter controller 54 are controlled by a general controller 56 which serves as a higher-level controller for determining a total load Lt etc. on the fuel cell 22.

Each of the general controller 56, the FC controller 50, the motor controller 52, and the converter controller 54 comprises a CPU, a ROM, a RAM, a timer, input and output interfaces including an A/D converter, a D/A converter, and, if necessary, a DSP (Digital Signal Processor), etc.

The general controller 56, the FC controller 50, the motor controller 52, and the converter controller 54 are connected to each other by communication lines 70 such as of a CAN (Controller Area Network) as an intravehicular LAN, and perform various functions by sharing input and output information from various switches and various sensors and executing programs stored in the ROMs under the CPUs based on the input and output information from the various switches and various sensors.

The switches and the sensors for detecting vehicle states include, in addition to the current sensor 32 for detecting the generated current If, a voltage sensor 61 for detecting a primary voltage V1 which is equal to the battery voltage Vbat, a current sensor 62 for detecting a primary current I1, a voltage sensor 63 for detecting the secondary voltage V2 which is equal to the generated voltage Vf across the fuel cell 22 when the disconnecting diode 33 is rendered conductive, a current sensor 64 for detecting the secondary current I2, an ignition switch (IGSW) 65, an accelerator sensor 66, a brake sensor 67, a vehicle speed sensor 68, and an operating unit 55 for operating the accessories 44 such as lamps, power window motors, wiper motors, etc., which are connected to the communication lines 70.

The general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands), determines the shares of a fuel cell allocated load (demand output) Lf to be allocated to the fuel cell 22, a battery allocated load (demand output) Lb to be allocated to the battery 24, and a regenerative power supply allocated load (demand output) Lr to be allocated to the regenerative power supply, through an arbitration process, based on the total demand load Lt, and sends commands indicative of the determined shares to the FC controller 50, the motor controller 52, and the converter controller 54.

The DC/DC converter 36 comprises a phase arm UA disposed between the first power device in the form of the battery 24 and the second power device in the form of the fuel cell 22 or the regenerative power supply (the inverter 34 and the motor 26). The phase arm UA is made up of an upper arm switching device 81 and a lower arm switching device 82 such as MOSFETs, IGBTs or the like. Diodes 83, 84 are connected inversely across the arm switching devices 81, 82, respectively. A single reactor 90 for discharging and storing energy at the time the DC/DC converter 36 converts between the primary voltage V1 and the secondary voltage V2 is inserted between the battery 24 and the midpoint (junction) of the phase arm UA. The upper arm switching device 81 is turned on by a gate drive signal (drive voltage) UH output from the converter controller 54 when the gate drive signal UH is high in level. The lower arm switching device 82 is turned on by a gate drive signal (drive voltage) UL output from the converter controller 54 when the gate drive signal UL is high in level.

Figure 2:
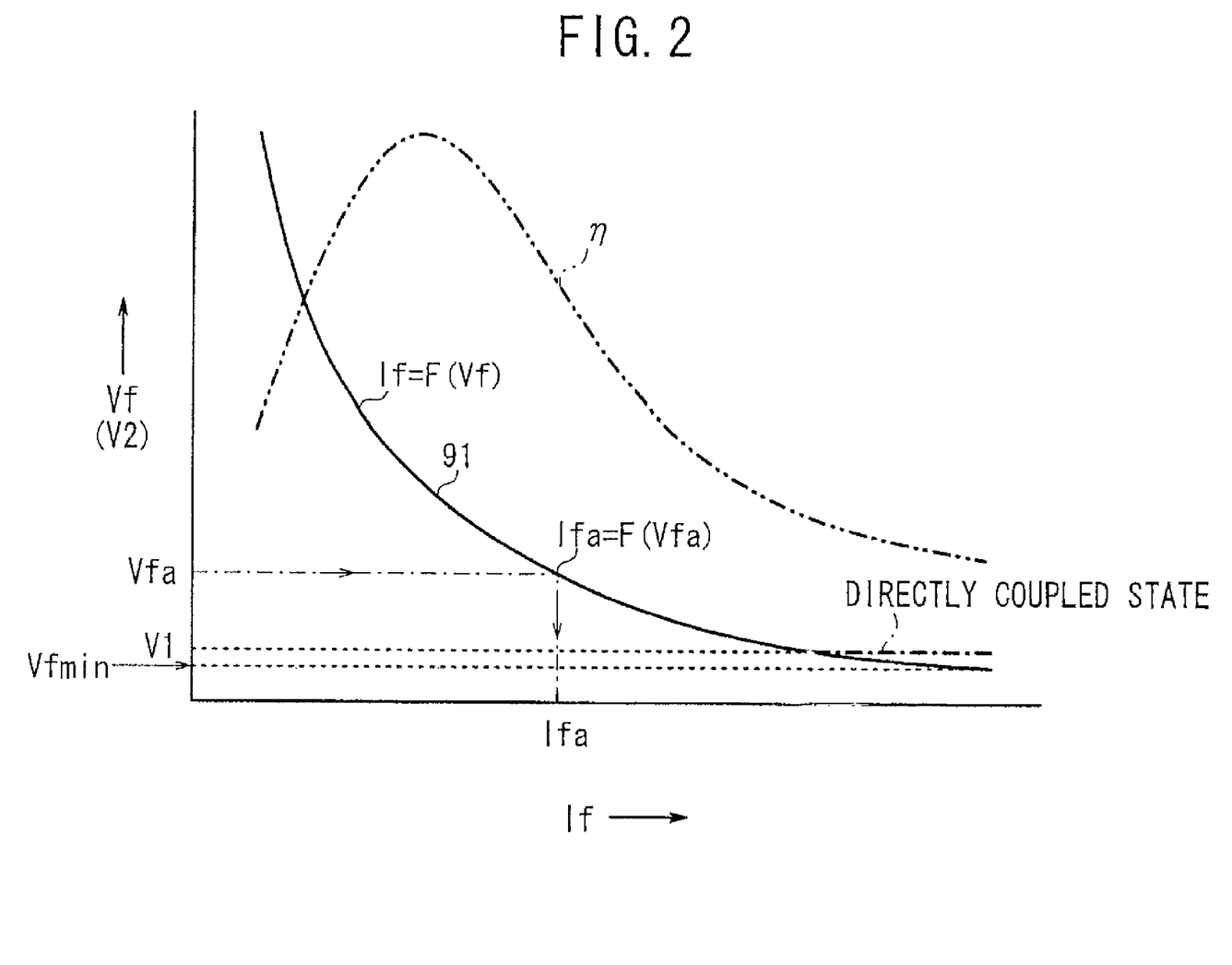
FIG. 2 is a diagram showing the current vs. voltage characteristics of a fuel cell.

The primary voltage V1, typically the open circuit voltage OCV (Open Circuit Voltage) across the battery 24 at the time no load is connected to the battery 24, is set to a voltage higher than a minimum voltage Vfmin of the generated voltage Vf of the fuel cell 22 as indicated by a fuel cell output characteristic curve (current vs. voltage characteristic curve) 91 shown in FIG. 2. In FIG. 2, OCV≈V1.

The secondary voltage V2 is equal to the generated voltage Vf of the fuel cell 22 while the fuel cell 22 is generating electric power.

When the generated voltage Vf of the fuel cell 22 becomes equal to the voltage Vbat (=V1) of the battery 24, the fuel cell 22 and the battery 24 are in a directly coupled state as indicated by the thick dot-and-dash line in FIG. 2. In the directly coupled state, the duty ratio of the gate drive signal UH supplied to the upper arm switching device 81 is 100%. In the directly coupled state, when a current is to flow from the secondary end 2S to the primary end 1S, the upper arm switching device 81 is turned on and the current flows through the upper arm switching device 81. When a current is to flow from the primary end 1S to the secondary end 2S, the diode 83 is turned on and the current flows through the diode 83.

The output control performed on the fuel cell 22 by the VCU 23 will be described below.

When the fuel cell 22 generates electric power while it is being supplied with the fuel gas from the hydrogen tank 28 and the compressed air from the air compressor 30, the generated current If of the fuel cell 22 is determined by the converter controller 54 setting the secondary voltage V2, i.e., the generated voltage Vf, through the DC/DC converter 36 on the characteristic curve 91, also referred to as "function F(Vf)", shown in FIG. 2. The generated current If is determined as a function F(Vf) value of the generated voltage Vf. Since If=F(Vf), if the generated voltage Vf is set as Vf=Vfa=V2, a generated current Ifa is determined as a function value of the generated voltage Vfa (or V2) according to Ifa=F(Vfa)=F(V2).

Specifically, when the generated voltage Vf as the second output voltage of the fuel cell 22 decreases, the generated current If as a source current flowing from the fuel cell 22 increases. Conversely, when the generated voltage Vf increases, the generated current If decreases.

Inasmuch as the generated current If of the fuel cell 22 is determined when the secondary voltage V2 (the generated voltage Vf) is determined, the secondary voltage V2 (the generated voltage Vf) on the secondary end 2S of the DC/DC converter 36 is normally set as a target voltage (target value) for the feedback control process performed by the VCU 23 including the converter controller 54 in the system including the fuel cell 22, such as the fuel cell vehicle 20. In other words, the output (generated current If) of the fuel cell 22 is controlled by the VCU 23, and the second voltage control mode for controlling the secondary voltage V2 to reach the target voltage is set as the operation mode of the DC/DC converter 36. The output control performed on the fuel cell 22 by the VCU 23 has been described above.

In special cases when the battery 24 is regarded as suffering a failure such as when the battery 24 is opened due to a disconnection of the power lines 18 between the downverter 42 and the battery 24, the operation mode of the DC/DC converter 36 is set (switched) to the primary voltage control mode in which the primary voltage V1 is used as the target voltage for the feedback control process performed by the VCU 23.

When the first source current Ibse flowing from the battery 24 is of a value exceeding a threshold value (current limit value) Ithse, or when the first sink current Ibsk flowing into the battery 24 is of a value exceeding a threshold value (current limit value) Ithsk, the secondary voltage control mode (or the primary voltage control mode) is switched (set) to a control process (current upper limit limiting control process or voltage limiting mode) using the primary current I1 as the target current in order to prevent the battery 24 from being deteriorated, to prevent the fuse 25 from blowing out, and to prevent the reactor 90 from being saturated. If the converter controller 54 detects when the battery 24 is short-circuited based on the voltage detected by the voltage sensor 61, then since the control process using the primary current I1 as the target current is not performed, the fuse 25 is blown out to protect the battery 24.

Therefore, at least two control modes among the primary voltage control mode, the secondary voltage control mode, and the current limiting mode are selectively set as the operation modes of the DC/DC converter 36. The DC/DC converter 36 operates according to the operation modes thus set. The DC/DC converter 36 switches from one of the operation modes to another according to a judging (control) process that is performed by the converter controller 54 or the general controller 56, which is described later.

Figure 3A:
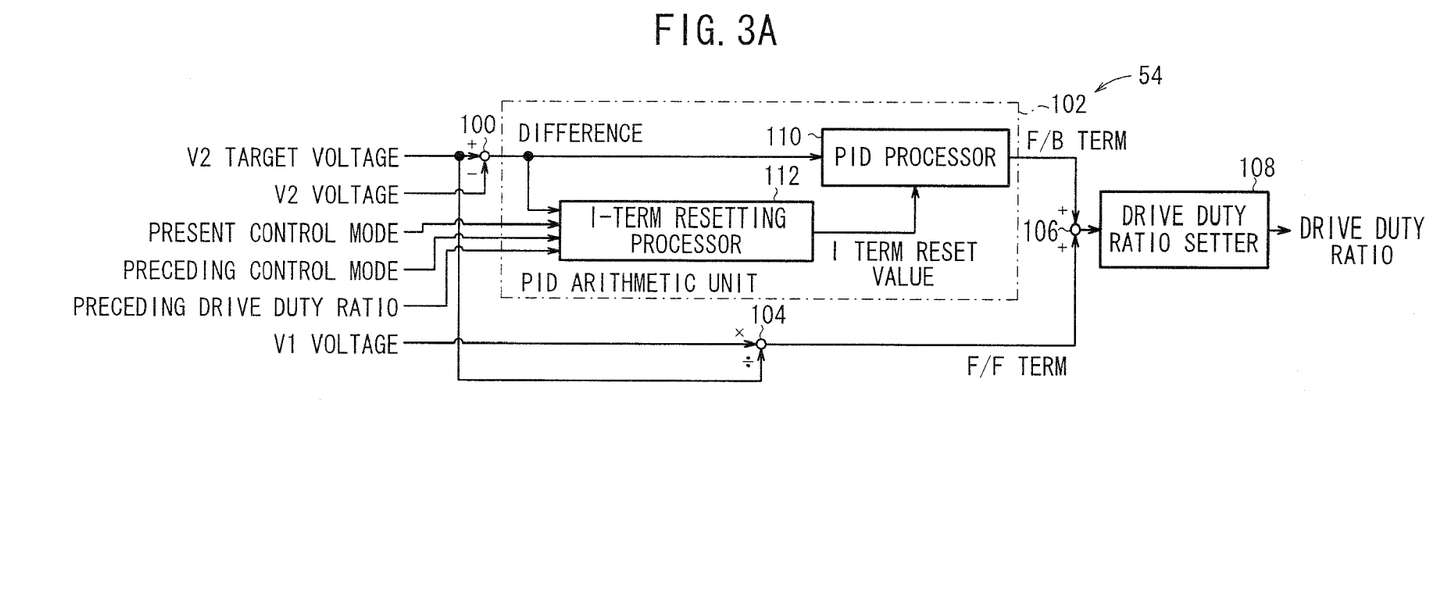
FIGS. 3A through 3C are functional block diagrams of a converter controller which correspond to respective operation modes of a DC/DC converter.
Figure 3B:
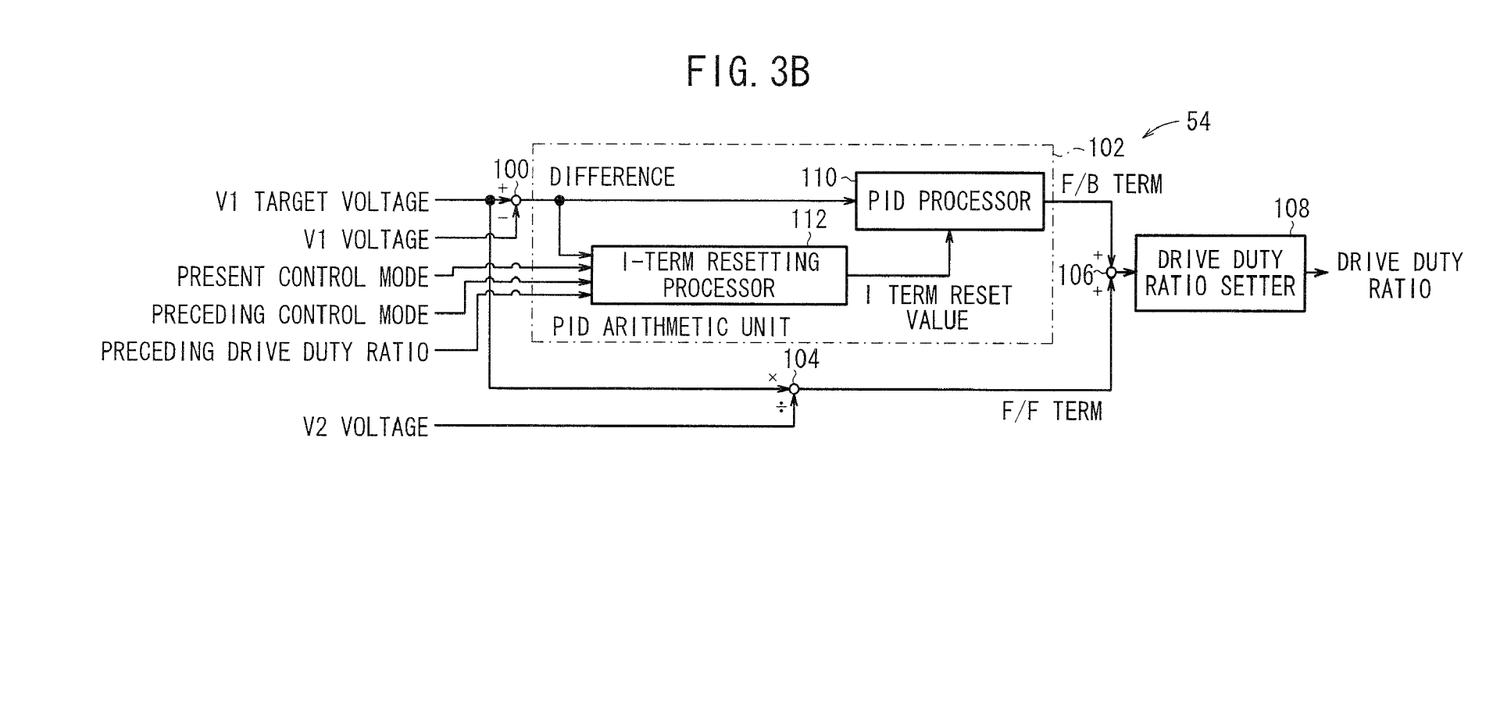
Figure 3C:
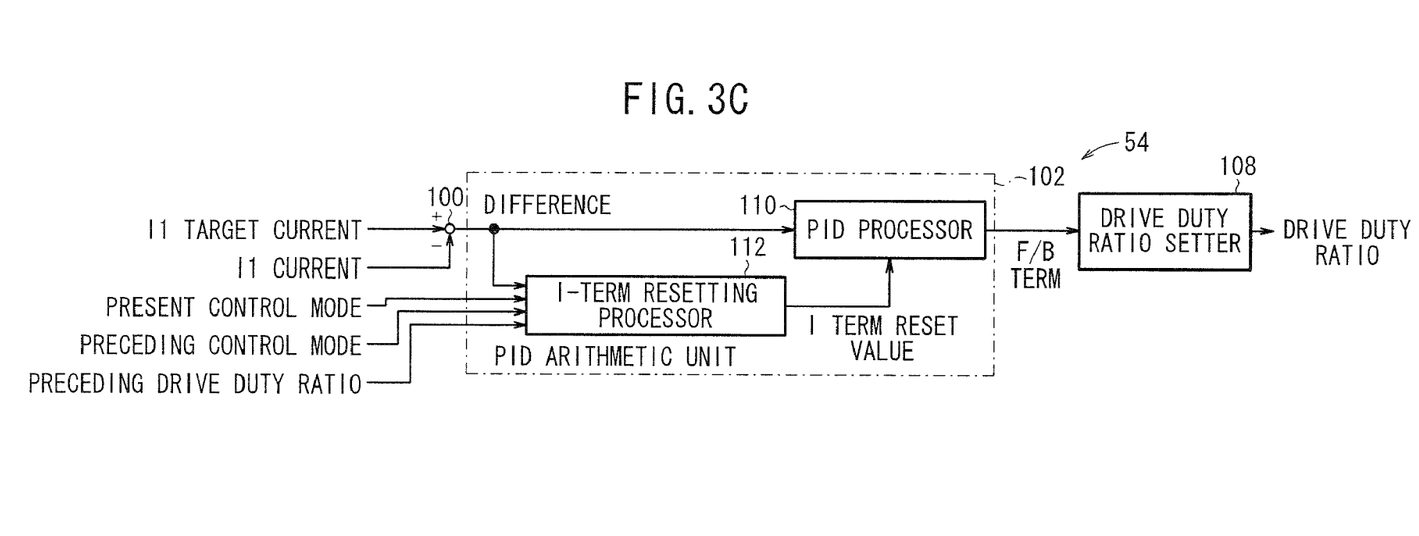

FIGS. 3A through 3C are functional block diagrams of the converter controller 54 when the DC/DC converter 36 is in the respective operation modes, i.e., the secondary voltage control mode, the primary voltage control mode, and the current limiting mode.

Specifically, FIGS. 3A through 3C are functional block diagrams of the converter controller 54 for setting duty ratios (drive duty ratios) for the gate drive signals UH, UL. FIG. 3A shows the converter controller 54 whose operation mode is the secondary voltage control mode. FIG. 3B shows the converter controller 54 whose operation mode is the primary voltage control mode. FIG. 3C shows the converter controller 54 whose operation mode is the current limiting mode.

In the secondary voltage control mode shown in FIG. 3A, the converter controller 54 comprises a subtractor 100, a PID (Proportional plus Integral plus Derivative) arithmetic unit 102, a divider 104, an adder 106, and a drive duty ratio setter 108. The PID arithmetic unit 102 comprises a PID processor 110 and an I-term (Integral term) resetting processor 112.

The subtractor 100 calculates the difference between the target voltage for the secondary voltage V2 and the secondary voltage V2 detected by the voltage sensor 63, and outputs the calculated difference to the PID processor 110 and the I-term resetting processor 112. The PID processor 110 performs a PID control process based on the supplied difference to calculate a feedback term (F/B term) of a drive duty ratio depending on the target voltage, and outputs the calculated F/B term to the adder 106. The divider 104 divides the primary voltage V1 detected by the voltage sensor 61 by the target voltage to calculate a feed-forward term (F/F term) of the drive duty ratio, and outputs the F/F term to the adder 106. The adder 106 adds the F/B term and the F/F term, and outputs the sum to the drive duty ratio setter 108. The drive duty ratio setter 108 calculates drive duty ratios for the gate drive signals UH, UL based on the F/B term and the F/F term supplied thereto, and outputs the calculated drive duty ratios.

The I-term resetting processor 112 compares the present control mode and the preceding control mode in each given time interval (e.g., a processing cyclic period of the converter controller 54) to determine whether the operation mode of the DC/DC converter 36 has switched or not.

If the I-term resetting processor 112 judges that the operation mode of the DC/DC converter 36 has switched from the primary voltage control mode or the current limiting mode to the secondary voltage control mode, then the I-term resetting processor 112 calculates an I term depending on the drive duty ratio of the preceding control mode (preceding drive duty ratio), and outputs (resets) the calculated I term as the I term of the present drive duty ratio to the PID processor 110. The PID processor 110 regards the input I term as the I term in the present Integral process (I process) and perform the PID control process based thereon.

The F/B term output from the PID processor 110 is the F/B term depending on the preceding drive duty ratio, and the present drive duty ratio output from the drive duty ratio setter 108 is the duty ratio depending on the preceding drive duty ratio. In other words, when the I-term resetting processor 112 resets the I term depending on the preceding drive duty ratio in the PID processor 110, the present drive duty ratio output from the drive duty ratio setter 108 becomes substantially equal to the preceding drive duty ratio (the preceding drive duty ratio≈the present drive duty ratio).

The I term (the set I-term value) reset from the I-term resetting processor 112 to the PID processor 110 and the drive duty ratio in the present control mode (the present drive duty ratio) immediately after the control mode has switched are expressed respectively by the following equations (1), (2):

$$\text{(the set } I\text{-term value)} = \text{(the preceding drive duty ratio)} - \text{(the present } F/F \text{ term)} - \text{(the present } P \text{ term)} - \text{(the present } D \text{ term)} \quad (1)$$

$$\begin{aligned}\text{(the present drive duty ratio)} &= \text{(the present } F/F \text{ term)} + \\ &\quad \text{(the present } P \text{ term)} + \\ &\quad \text{(the present } I \text{ term)} + \\ &\quad \text{(the present } D \text{ term)} \\ &= \text{(the present } F/F \text{ term)} + \\ &\quad \text{(the present } P \text{ term)} + \\ &\quad \left\{\begin{array}{l}\text{(the preceding drive duty ratio)} - \\ \text{(the present } F/F \text{ term)} - \\ \text{(the present } P \text{ term)} - \\ \text{(the present } D \text{ term)}\end{array}\right\} \\ &= \text{(the preceding drive duty ratio)}\end{aligned} \quad (2)$$

In the equations (1), (2), the term "preceding" refers to existing immediately before the operation mode switches, and the term "present" refers to existing immediately after the operation mode switches. The term "P term" refers to the proportional term in the PID process, and the term "D term" refers to the derivative term in the PID process.

In the primary voltage control mode shown in FIG. 3B, the converter controller 54 also has the subtractor 100, the PID arithmetic unit 102, the divider 104, the adder 106, and the drive duty ratio setter 108, as is the case with the secondary voltage control mode shown in FIG. 3A. However, the converter controller 54 operates differently as follows:

The subtractor 100 calculates the difference between the target voltage for the primary voltage V1 and the primary voltage V1 detected by the voltage sensor 61, and outputs the calculated difference to the PID processor 110 and the I-term resetting processor 112. The divider 104 divides the target voltage by the secondary voltage V2 to calculate an F/F term, and outputs the F/F term to the adder 106. If the I-term resetting processor 112 judges that the operation mode of the DC/DC converter 36 has switched from the secondary voltage control mode or the current limiting mode to the primary voltage control mode, then the I-term resetting processor 112 calculates an I term depending on the preceding drive duty ratio, and outputs (resets) the calculated I term as the I term of the present drive duty ratio to the PID processor 110.

The set I-term value output from the I-term resetting processor 112 to the PID processor 110 and the present drive duty ratio immediately after the operation mode has switched are expressed respectively by the above equations (1), (2) even though the operation mode immediately after it has switched is the primary voltage control mode.

In the current limiting mode shown in FIG. 3C, the converter controller 54 is different from the converter controller 54 in the secondary voltage control mode shown in FIG. 3A and the converter controller 54 in the primary voltage control mode shown in FIG. 3B, in that the converter controller 54 is devoid of the divider 104 for outputting an F/F term and the adder 106. The converter controller 54 also operates differently as follows:

The subtractor 100 calculates the difference between the target current for the primary current I1 and the primary current I1 detected by the current sensor 62, and outputs the calculated difference to the PID processor 110 and the I-term resetting processor 112. The PID processor 110 calculates an F/B term depending on the target current according the PID control process using the difference, and outputs the calculated F/B term to the drive duty ratio setter 108. The drive duty ratio setter 108 calculates a drive duty ratio based on the F/B term, and outputs the calculated drive duty ratio.

If the I-term resetting processor 112 judges that the operation mode of the DC/DC converter 36 has switched from the primary voltage control mode or the secondary voltage control mode to the current limiting mode, then the I-term resetting processor 112 calculates an I term depending on the preceding drive duty ratio, and outputs the calculated I term as the I term of the present drive duty ratio to the PID processor 110.

In the current limiting mode, the set I-term value output (reset) from the I-term resetting processor 112 to the PID processor 110 and the present drive duty ratio immediately after the operation mode has switched are expressed respectively by the following equations (3), (4):

$$\text{(the set } I\text{-term value)} = \text{(the preceding drive duty ratio)} - \text{(the present } P \text{ term)} - \text{(the present } D \text{ term)} \quad (3)$$

$$\begin{aligned}\text{(the present drive duty ratio)} &= \text{(the present } P \text{ term)} + \\ &\quad \text{(the present } I \text{ term)} + \\ &\quad \text{(the present } D \text{ term)} \\ &= \text{(the present } P \text{ term)} + \\ &\quad \left\{\begin{array}{l}\text{(the preceding drive duty ratio)} - \\ \text{(the present } P \text{ term)} - \\ \text{(the present } D \text{ term)}\end{array}\right\} \\ &= \text{(the preceding drive duty ratio)}\end{aligned} \quad (4)$$

The set I-term value is output from the I-term resetting processor 112 to the PID processor 110 when the I-term resetting processor 112 judges that the operation mode of the DC/DC converter 36 has switched. If the I-term resetting processor 112 judges that the operation mode of the DC/DC converter 36 has not switched, then the set I-term value is not output to the PID processor 110. If the PID processor 110 is not supplied with the set I-term value, then the PID processor 110 performs PID calculations based on the present I term.

The fuel cell vehicle 20 according to the present embodiment is basically constructed and operates as described above. Operation of the fuel cell vehicle 20 with respect to switching between the operation modes of the DC/DC converter 36 will be described below with reference to FIGS. 1 through 6.

When there is no disconnection of the power lines 18 and the source current Ibse flowing from the battery 24 is not of a value exceeding a threshold value Ithse, or the sink current Ibsk flowing into the battery 24 is not of a value exceeding a threshold value Ithsk, i.e., when the fuel cell vehicle 20 is operating normally, the DC/DC converter 36 operates in the secondary voltage control mode.

In the secondary voltage control mode, the general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands), determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, through an arbitration process, based on the total demand load Lt, and sends commands indicative of the determined shares to the FC controller 50, the motor controller 52, and the converter controller 54.

Figure 4:
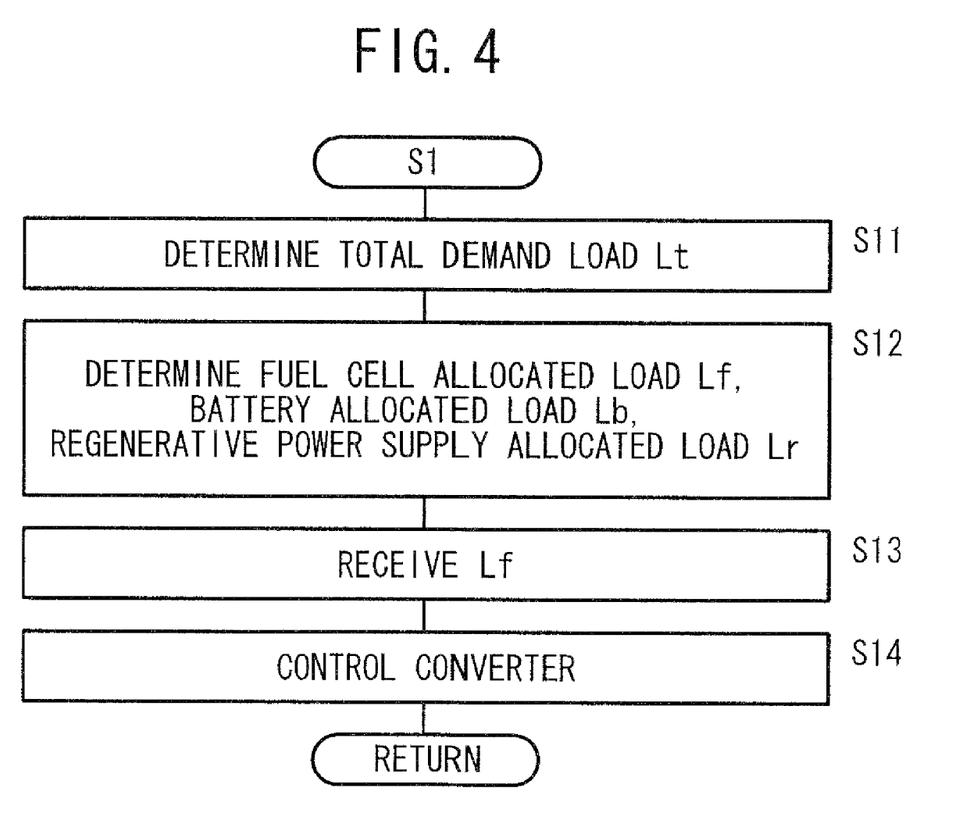
FIG. 4 is a flowchart of a basic control sequence of a DC/DC converter controlled by a converter controller.

FIG. 4 shows details of a basic processing sequence of the DC/DC controller 36 in the secondary voltage control mode. In step S11 shown in FIG. 4, the general controller 56 determines (calculates) a total demand load Lt from the power demand of the motor 26, the power demand of the accessories 44, and the power demand of the air compressor 30, which all represent load demands. In step S12, the general controller 56 determines the shares of a fuel cell allocated load Lf, a battery allocated load Lb, and a regenerative power supply allocated load Lr for outputting the determined total demand load Lt, and sends commands indicative of the determined shares to the FC controller 50, the motor controller 52, and the converter controller 54. When the general controller 56 determines the fuel cell allocated load Lf, the general controller 56 takes the efficiency η of the fuel cell 22 into account.

Then, in step S13, the fuel cell allocated load (essentially including a command voltage V2com for the generated voltage Vf to be directed to the converter controller 54) Lf determined by the general controller 56 is transmitted as a command through the communication lines 70 to the converter controller 54.

In response to the command of the fuel cell allocated load Lf, the converter controller 54 controls the drive duty ratios (on-duty ratios of the drive signals UH, LH) for driving the arm switching devices 81, 82 of the DC/DC converter 36 to bring the secondary voltage V2, i.e., the generated voltage Vf of the fuel cell 22, into conformity with the command voltage V2com from the general controller 56, in step S14. The drive duty ratios are controlled (calculated) by the converter controller 54 in the secondary voltage control mode shown in FIG. 3A. In other words, in step S14, the secondary voltage V2 is increased or lowered into conformity with the command voltage V2com.

The process of increasing or lowering the voltage with the circuit arrangement of the DC/DC converter 36 shown in FIG. 1 is well known in the art and will not be described in detail below.

The FC controller 50 and the motor controller 52 which perform their processing sequences according to the commands from the general controller 56.

The FC controller 50, the converter controller 54, and the motor controller 52 report the results of their control processes to the general controller 56 from time to time.

According to the present embodiment, while the above processing sequences are being carried out, the converter controller 54 performs a process of detecting a possible disconnection of the power lines 18 in each of switching periods 2π of the switching devices 81, 82.

In the process of detecting a possible disconnection of the power lines 18, the converter controller 54 detects (calculates) a rate of change (a rate of increase or a rate of decrease) VS1 [V/s] ([V/s]=[voltage/second]) of the primary voltage V1 detected by the voltage sensor 61.

If the power lines 18 suffer a disconnection while the battery current Ibat is flowing as a discharging current from the battery 24, then the primary voltage V1 starts decreasing quickly. If the power lines 18 suffer a disconnection while the battery current Ibat is flowing as a charging current into the battery 24, then the primary voltage V1 starts increasing quickly.

If the rate of change VS1 of the primary voltage V1 is greater than a threshold rate VSref, then the converter controller 54 assumes that the power lines 18 suffer a disconnection, i.e., the converter controller 54 recognizes that the power lines 18 suffer a possible disconnection, and immediately switches the operation mode of the DC/DC converter 36 from the secondary voltage control mode (see FIG. 3A) to the primary voltage control mode (see FIG. 3B).

The threshold rate VSref is of a value that has been determined by simulations and experiments with respect to both the rate of increase and the rate of decrease of the primary voltage V1. A table (map) of threshold rates VSref for the rate of increase and the rate of decrease may be prepared in advance depending on the values of the present primary current I1 and the battery current Ibat and the loads imposed by the accessories 44.

When the converter controller 54 switches the operation mode of the DC/DC converter 36 from the secondary voltage control mode to the primary voltage control mode, the converter controller 54 notifies the general controller 56 of the switching from the secondary voltage control mode to the primary voltage control mode.

Figure 5A:
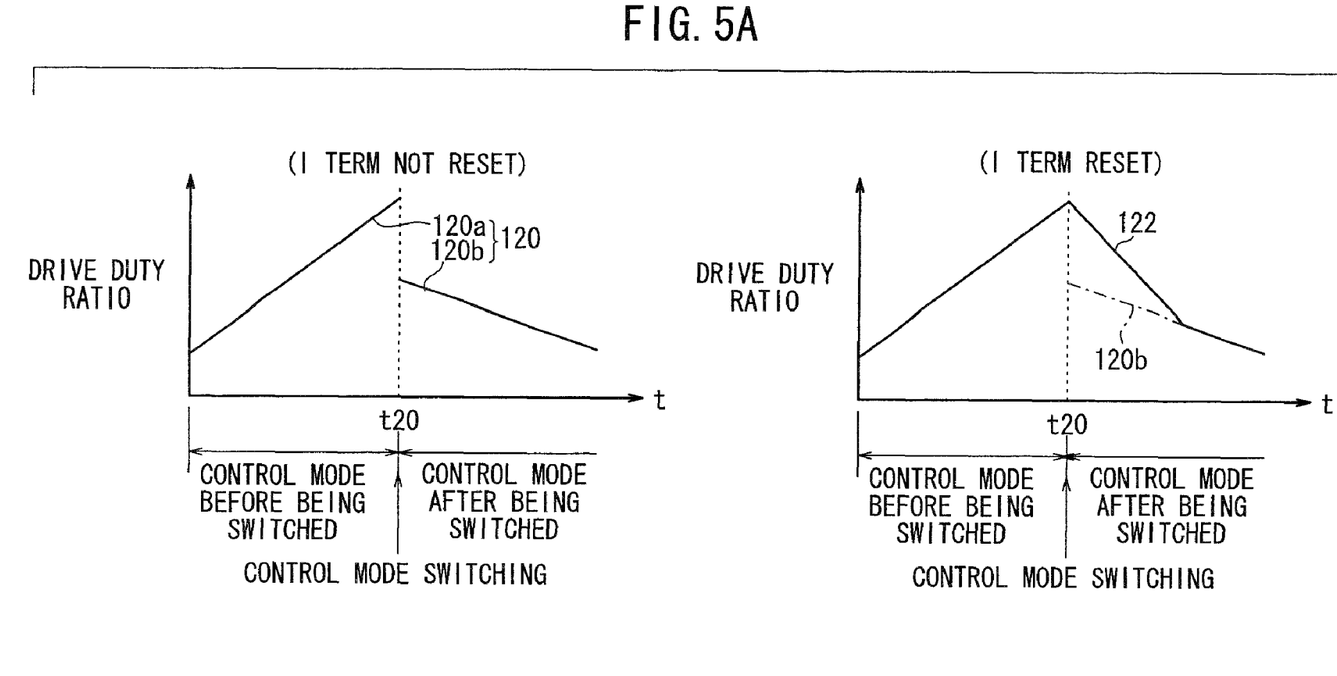
FIGS. 5A and 5B are graphs showing time-dependent changes of drive duty ratios upon switching between control modes.
Figure 5B:
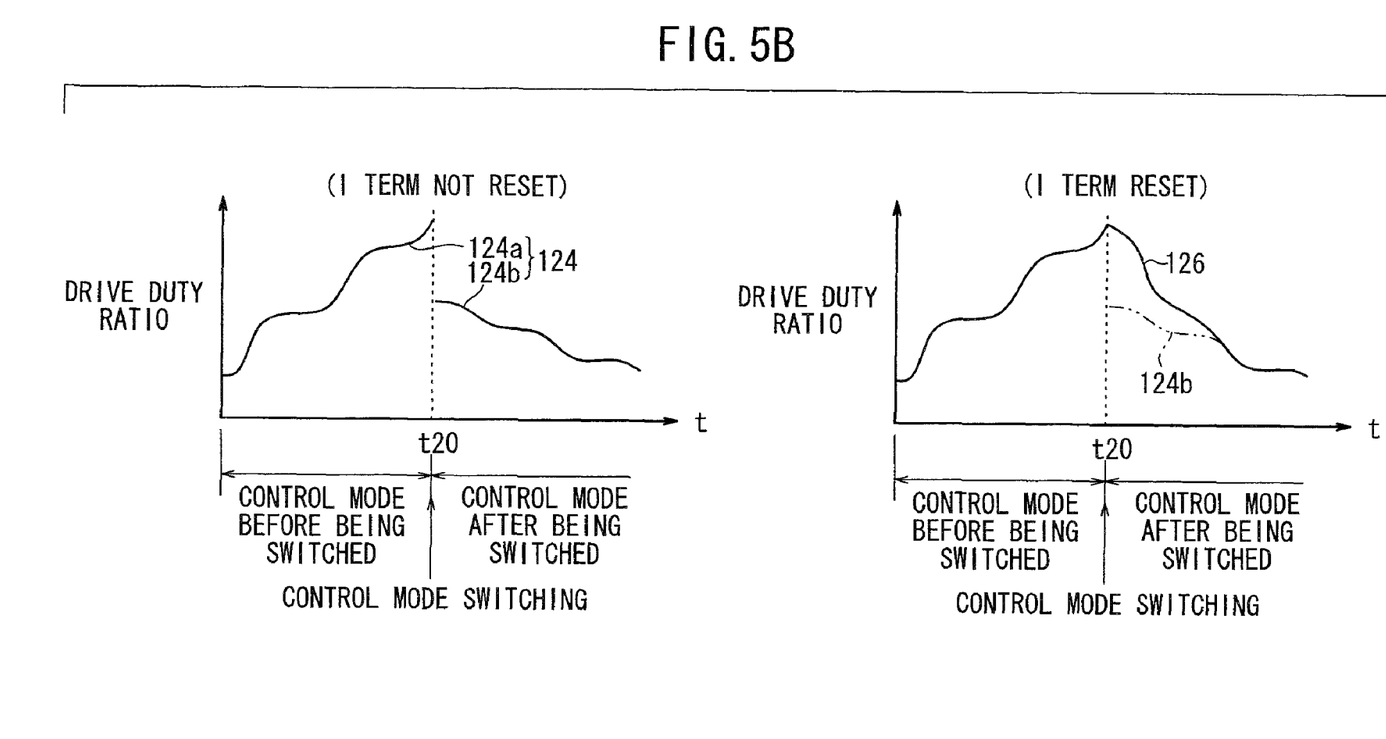
Figure 6:
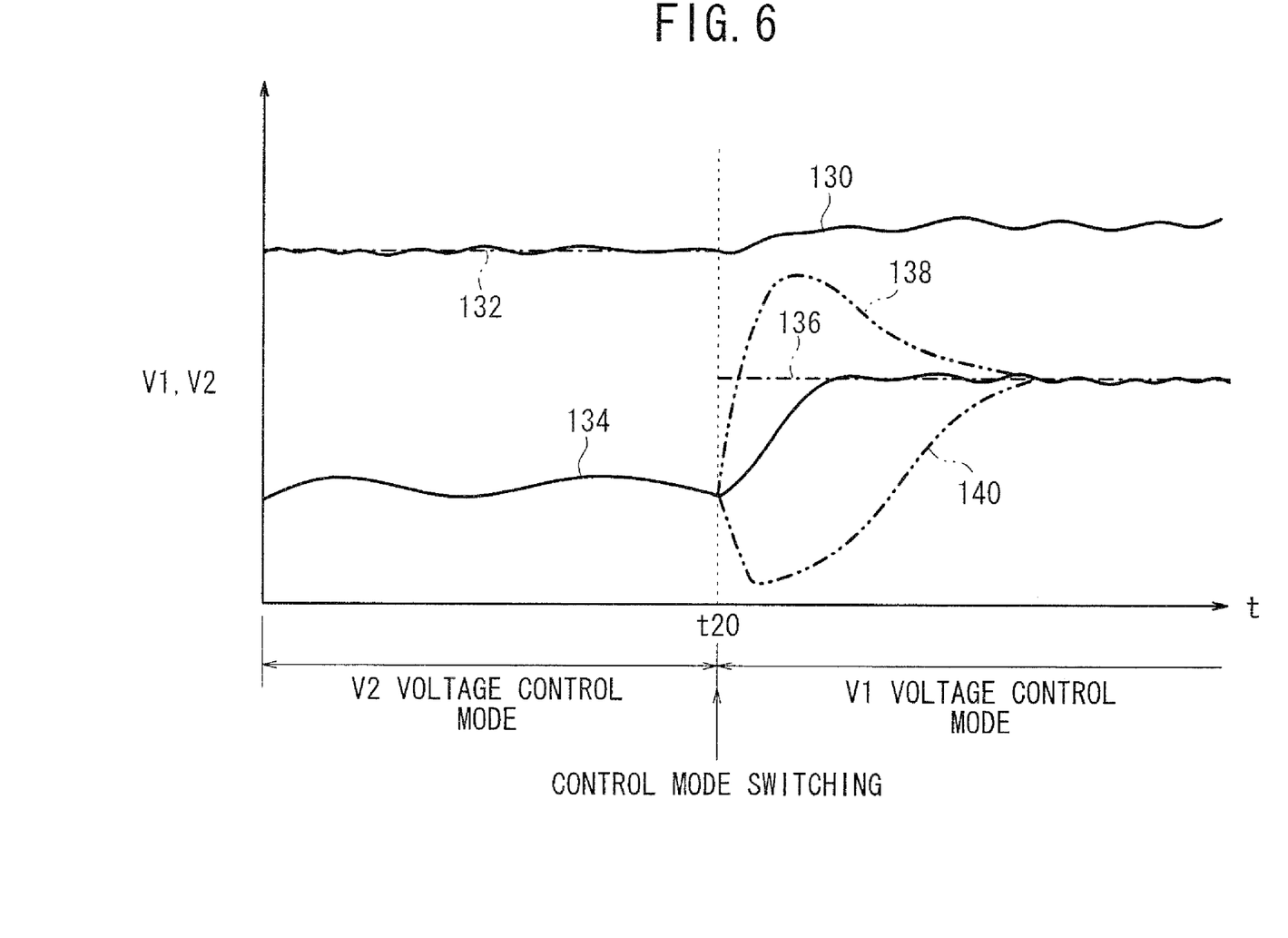
FIG. 6 is a graph showing time-dependent changes of primary and secondary voltages upon switching between control modes.

FIGS. 5A and 5B are graphs schematically showing time-dependent changes of drive duty ratios upon switching between control modes, i.e., upon switching from the secondary voltage control mode to the primary voltage control mode. FIG. 6 is a graph schematically showing time-dependent changes of the primary voltage V1 and the secondary voltage V2 upon switching between the control modes.

In FIGS. 5A, 5B, and 6, time t20 represents a time at which the control modes are switched. In each of FIGS. 5A and 5B, the left graph shows an instance in which the I term is not reset by the I-term resetting processor 112 (see FIG. 3B) at time t20, and the right graph shows an instance in which the I term is reset by the I-term resetting processor 112 at time t20.

In FIGS. 5A and 5B, if the I term is not reset, a straight line 120 and a curved line 124 indicative of a time-depending change of the drive duty ratio are discontinuous across time t20. Specifically, the straight line 120 includes a straight line segment 120*a* in the control mode prior to time t20 (the control mode before being switched) and a straight line segment 120*b* in the control mode subsequent to time t20 (the control mode after being switched), the straight line segments 120*a*, 120*b* being discontinuous across time t20. The curved line 124 includes a curved line segment 124*a* in the control mode prior to time t20 (the control mode before being switched) and a curved line segment 124*b* in the control mode subsequent to time t20 (the control mode after being switched), the curved line segments 124*a*, 124*b* being discontinuous across time t20. This is because the control mode prior to time t20 (the secondary voltage control mode) and the control mode subsequent to time t20 (the primary voltage control mode) have different entities to be controlled (the primary voltage V1 and the secondary voltage V2), and hence the drive duty ratios are controlled depending on different target voltages in those control modes.

In FIGS. 5A and 5B, if the I term is reset, a straight line 122 and a curved line 126 indicative of a time-depending change of the drive duty ratio are continuous across time t20.

Specifically, according to the straight line 122, the drive duty ratio immediately before time t20 (the drive duty ratio in the control mode before being switched) and the drive duty ratio immediately after time t20 (the drive duty ratio in the control mode after being switched) are in agreement with each other, and the straight line 122 is continuous across time t20. According to the curved line 126, the drive duty ratio immediately before time t20 (the drive duty ratio in the control mode before being switched) and the drive duty ratio immediately after time t20 (the drive duty ratio in the control mode after being switched) are in agreement with each other, and the curved line 126 is continuous across time t20.

As shown in FIG. 3B, the I-term resetting processor 112 determines whether the operation mode has switched at time t20 or not. If the I-term resetting processor 112 judges that the operation mode has switched at time t20, then the I-term resetting processor 112 outputs an I term depending on the drive duty ratio in the operation mode before being switched such that the drive duty ratio in the operation mode immediately after being switched (the primary voltage control mode) will become the drive duty ratio in the operation mode before being switched (the secondary voltage control mode), and the PID processor 110 calculates an F/B term while regarding the input I term as the I term in the PID control process immediately after the operation mode has switched.

The drive duty ratio setter 108 outputs the drive duty ratio depending on the I term, i.e., the drive duty ratio depending on the drive duty ratio in the control mode before being switched, as the drive duty ratio in the control mode after being switched. As a result, as shown in FIG. 6, when the secondary voltage control mode up to time t20, i.e., the control process for bringing a curved line 130 representative of the secondary voltage V2 into conformity with a straight line 132 representative of the target voltage, switches to the primary voltage control mode at time t20, i.e., the control process for bringing a curved line 134 representative of the primary voltage V1 into conformity with a straight line 136 representative of the target voltage, the drive duties are made continuous across time t20 (see FIGS. 5A and 5B). Consequently, the primary voltage V1 can be brought into conformity with the target voltage reliably in a short period of time.

The converter controller 54 calculates drive duty ratios in order to bring the straight line 122 and the curved line 126 quickly into conformity with the straight line 120b and the curved line 124b in the control mode after being switched subsequently to time t20. Specifically, after time t20, since there is no control mode switching, the I-term resetting processor 112 does not output a set I term value to the PID processor 110, and the PID processor 110 performs PID calculations based on the present I term.

In FIG. 6, curved lines 138, 140 indicate instances in which the I term is not reset. According to the curved lines 138, 140, voltage fluctuations represented by an overshoot (the curved line 138) and an undershoot (the curved line 140) occur immediately after time t20.

From the time at which the general controller 56 is notified of the start of the change from the secondary voltage control mode to the primary voltage control mode by the converter controller 54, the general controller 56 waits for several seconds in a range from 2 to 3 seconds to 5 to 6 seconds to elapse, and then confirms a disconnection of the power lines 18. Specifically, if the general controller 56 judges that all the accessory current Iau is covered by the primary current I1 (Iau≈I1) during those several seconds, then the general controller 56 confirms a disconnection of the power lines 18.

If the general controller 56 judges that some of the accessory current Iau is also covered by the battery current Ibat {Iau=Ibat+I1 (including I1=0)}, then the general controller 56 confirms that the possible disconnection of the power lines 18 is an error, and switches from the present primary voltage control mode to the secondary voltage control mode. Upon switching from the present primary voltage control mode to the secondary voltage control mode, the I-term resetting processor 112 outputs an I term for bringing the drive duty ratio in the primary voltage control mode before switching into conformity with the drive duty ratio in the secondary voltage control mode after switching to the PID processor 110.

When the source current Ibse flowing from the battery 24 reaches a value in excess of the threshold value Ithse or the sink current Ibsk flowing into the battery 24 reaches a value in excess of the threshold value Ithsk during the secondary voltage control mode (see FIG. 3A), the converter controller 54 judges that the battery 24 may possibly be deteriorated, or that the fuse 25 may possibly be blown out, or that the reactor 90 may be saturated. Then, the converter controller 54 interrupts the secondary voltage control mode, and switches to the current limiting mode (see FIG. 3C) for controlling the DC/DC converter 36 to keep the source current Ibse or the sink current Ibsk at the threshold value Ithse or Ithsk.

In this case, the I-term resetting processor 112 of the converter controller 54 also outputs an I term for bringing the drive duty ratio in the secondary voltage control mode and the drive duty ratio in the current limiting mode into conformity with each other to the PID processor 110 at the time when the secondary voltage control mode switches to the current limiting mode. The PID processor 110 performs the PID control process based on the input I term. After the secondary voltage control mode has switched to the current limiting mode, the converter controller 54 monitors the secondary voltage V2. If the converter controller 54 judges that there is no need to limit the current, then the converter controller 54 returns (switches) from the current limiting mode to secondary voltage control mode.

For example, in the current limiting mode for limiting the source current Ibse, the converter controller 54 monitors the secondary voltage V2. When the secondary voltage V2 exceeds the command voltage V2com from the general controller 56, the converter controller 54 judges that there is no need to limit the current, and returns from the current limiting mode to secondary voltage control mode. Alternatively, in the current limiting mode for limiting the sink current Ibsk, the converter controller 54 monitors the secondary voltage V2. When the secondary voltage V2 becomes smaller than the command voltage V2com, the converter controller 54 judges that there is no need to limit the current, and returns from the current limiting mode to secondary voltage control mode. Further alternatively, after the secondary voltage control mode has switched to the current limiting mode, the converter controller 54 monitors the secondary voltage V2. When the secondary voltage V2 has increased to its level before the secondary voltage control mode switches to the current limiting mode, the converter controller 54 judges that there is no need to limit the current, and returns from the current limiting mode to secondary voltage control mode.

According to the present embodiment, as described above, when the DC/DC converter 36 switches from one operation mode to another, the drive duty ratios in those operation modes are made continuous to reduce fluctuations in the primary voltage V1, the secondary voltage V2, and the primary current I1 immediately after the operation mode switching.

By setting the I term in the operation mode after being switched such that the drive duty ratios in the operation modes are substantially equal to each other upon switching between the operation modes, the drive duty ratios in those operation modes are prevented from changing abruptly upon the operation mode switching. As a result, fluctuations in the primary voltage V1, the secondary voltage V2, and the primary current I1 immediately after the operation mode switching can efficiently be reduced.

By resetting the I term according to the equations (1) and (3), fluctuations in the primary voltage V1, the secondary voltage V2, and the primary current I1 immediately after the mode switching are reliably reduced. The present embodiment is thus easily applicable to a DC/DC converter for controlling the primary voltage V1, the secondary voltage V2, and the primary current I1 according to the PID control process.

The present embodiment is also applicable to a DC/DC converter for performing a feed-forward control process and a DC/DC converter for performing a PID control process and a feed-forward control process. Specifically, as shown in FIGS. 3A and 3B, the converter controller 54 is constructed to perform a feedback control process and a feed-forward control process. However, the divider 104 may be omitted, and the converter controller 54 may perform only a feedback control process to achieve the advantages described above.

The converter controller 54 may switch from the primary voltage control mode to the secondary voltage control mode or switch from the secondary voltage control mode to the primary voltage control mode based on whether the power lines 18 suffer a possible disconnection, or may switch from the primary voltage control mode or the secondary voltage control mode to the current limiting mode based on whether the source current Ibse or the sink current Ibsk is of a value exceeding the threshold value Ithse or Ithsk. After the mode has switched to the current limiting mode, the converter controller 54 may monitor the primary voltage V1 or the secondary voltage V2, and may return (switch) from the current limiting mode to the primary voltage control mode or the secondary voltage control mode.

In this manner, after the DC/DC converter 36 has switched from the secondary voltage control mode to the primary voltage control mode, the DC/DC converter 36 may quickly return to the secondary voltage control mode. Even after the DC/DC converter 36 has switched from the primary voltage control mode or the secondary voltage control mode to the current limiting mode, the DC/DC converter 36 may quickly return from the current limiting mode to the primary voltage control mode or the secondary voltage control mode.

Since fluctuations in the primary voltage V1, the secondary voltage V2, and the primary current I1 upon operation mode switching are reliably reduced, the battery 24, the motor 26, and the fuel cell 22 can be of a long service life. Particularly, the fuel cell 22 can easily have a long service life because the stacked structure of the fuel cell 22 which is susceptible to fluctuations in the primary voltage V1, the secondary voltage V2, and the primary current I1 is reliably prevented from being deteriorated.

The present embodiment is applicable to not only the VCU 23 having the DC/DC converter 36 with the single phase arm UA, but also a DC/DC converter apparatus having a DC/DC converter which includes a plurality of phase arms, i.e., two or more phase arms. In other words, the present invention offers the advantages described above regardless of the number of phase arms.

Although certain preferred embodiments of the present invention have been shown and described in detail, it should be understood that various changes and modifications may be made therein without departing from the scope of the appended claims.

What is claimed is:

1. A method of controlling a DC/DC converter apparatus disposed between a first power device and a second power device for energizing at least one switching device with given duty ratios, wherein the DC/DC converter apparatus includes a DC/DC converter and a controller for energizing said at least one switching device, comprising the steps of:
setting, as operation modes, at least two of a primary voltage control mode for controlling a primary voltage of the DC/DC converter which is associated with the first power device, a secondary voltage control mode for controlling a secondary voltage of the DC/DC converter which is associated with the second power device, and a current limiting mode for controlling the primary voltage or the secondary voltage in order to prevent a current which flows between the first power device and the second power device through the DC/DC converter from exceeding a threshold value;
when switching between said at least two operation modes, making a duty ratio in the operation mode before being switched and a duty ratio in the operation mode after being switched, continuous with respect to each other,
setting the duty ratios in the respective operation modes according to a feedback control process including an integral process, with the controller;
setting an integral term of the feedback control process in each of the operation modes, with the controller; and
when switching between the operation modes, setting the integral term in the operation mode after being switched in order to substantially equalize the duty ratio in the operation mode before being switched and the duty ratio in the operation mode after being switched.

2. A method according to claim 1, further comprising the steps of:
performing the feedback control process which includes a proportional process, the integral process, and a derivative process, in each of the operation modes, with the controller; and
when switching between the operation modes, setting the integral term in the operation mode after being switched, based on a difference obtained by subtracting proportional and derivative terms of the feedback control process in the operation mode after being switched, from the duty ratio in the operation mode before being switched.

3. A method according to claim 2, further comprising the step of:
if the operation mode is the primary voltage control mode or the secondary voltage control mode, performing a feed-forward control process for setting the primary voltage or the secondary voltage to a target voltage, with the controller.

4. A method according to claim 3, further comprising the step of:
if the operation mode after being switched is the primary voltage control mode or the secondary voltage control mode, setting the integral term in the operation mode after being switched, based on a difference obtained by subtracting the proportional and derivative terms in the operation mode after being switched and a feed-forward term of the feed-forward control process in the operation mode after being switched, from the duty ratio in the operation mode before being switched.

5. A method according to claim 1, further comprising the step of:
switching from the primary voltage control mode to the secondary voltage control mode based on whether the first power device suffers a disconnection or not; or
switching from the secondary voltage control mode to the primary voltage control mode based on whether the first power device suffers a disconnection or not; or
switching from the primary voltage control mode or the secondary voltage control mode to the current limiting mode based on whether the current is of a value exceeding the threshold value or not, and after the DC/DC converter has switched to the current limiting mode, monitoring the primary voltage or the secondary voltage, and returning from the current limiting mode to the primary voltage control mode or the secondary voltage control mode.

6. A method of controlling driving operation of an electric vehicle based on a method according to claim 1, wherein the electric vehicle includes the DC/DC converter apparatus, the first power device, and the second power device.

7. A method according to claim 6, wherein the first power device comprises an electricity storage device for generating the primary voltage, the electricity storage device being connected to an accessory, and the second power device comprises an electric motor for rotating a wheel and an electric generating device for generating a voltage, the electric generating device being connected to an inverter for energizing the electric motor, and wherein the secondary voltage is the generated voltage or a regenerative voltage generated in the inverter when the electric motor operates as an electric generator.

8. A method according to claim 7, wherein the electric generating device comprises a fuel cell.

* * * * *